United States Patent [19]

Lang et al.

[11] 4,170,553
[45] Oct. 9, 1979

[54] PROCESS AND APPARATUS FOR THE CONTROLLED FLOCCULATING OR PRECIPITATING OF FOREIGN SUBSTANCES FROM A LIQUID

[75] Inventors: Helmut Lang, Stuttgart; Horst Overath, Niederwalluf; Heinz-Werner Priester, Bochum-Weitmar, all of Fed. Rep. of Germany

[73] Assignee: GST-Regeltechnik GmbH, Fed. Rep. of Germany

[21] Appl. No.: 874,367

[22] Filed: Feb. 1, 1978

[30] Foreign Application Priority Data

Feb. 1, 1977 [DE] Fed. Rep. of Germany ....... 2704080
Feb. 5, 1977 [DE] Fed. Rep. of Germany ....... 2704816

[51] Int. Cl.$^2$ .............................................. C02B 1/20
[52] U.S. Cl. ........................................... 210/49; 210/57;
210/96.1; 210/143; 210/209; 422/66; 422/111;
137/3; 137/93
[58] Field of Search .................. 210/42 R, 49, 51, 57,
210/96 R, 105, 143, 202, 209, DIG. 29, 208,
215, 220, 205; 356/201, 204, 205, 206; 23/230
R; 422/66, 111; 137/3, 4, 93; 73/61.4

[56] References Cited

U.S. PATENT DOCUMENTS

| Re. 28,940 | 8/1976 | Komline | 73/61.4 |
|---|---|---|---|
| 3,067,133 | 12/1962 | Conley | 210/42 R |
| 3,399,133 | 8/1968 | Gerdes | 210/96 R |
| 3,462,364 | 8/1969 | Carlson | 210/42 R |
| 3,605,775 | 9/1971 | Zaander | 210/42 R |
| 3,731,807 | 5/1973 | Louboutin | 210/96 |
| 3,812,966 | 5/1974 | Beach | 210/96 |
| 3,826,741 | 7/1974 | Nakamura | 210/96 |

FOREIGN PATENT DOCUMENTS

| 1152066 | 7/1963 | Fed. Rep. of Germany | 210/96 |
|---|---|---|---|
| 1162292 | 1/1964 | Fed. Rep. of Germany | 210/51 |
| 1192604 | 4/1967 | United Kingdom | 210/42 R |
| 1321222 | 5/1970 | United Kingdom | 210/51 |
| 431890 | 7/1975 | U.S.S.R. | 210/96 R |

*Primary Examiner*—Charles N. Hart
*Assistant Examiner*—Ernest G. Therkorn
*Attorney, Agent, or Firm*—Ostrolenk, Faber, Gerb & Soffen

[57] ABSTRACT

This invention relates to a process for the controlled flocculating or precipitating of foreign substances from a liquid by the addition of a flocculating agent, at least a partial quantity of the liquid being treated with a dosed amount of the flocculating agent, the flocculation or precipitation caused thereby in said partial quantity being measured by a turbidity measurement and the addition of the flocculating agent to the liquid to be treated being determined on basis of the turbidity measurement. An apparatus for the carrying out of such a process also constitutes the object of this invention.

10 Claims, 11 Drawing Figures

PROCESS AND APPARATUS FOR THE CONTROLLED FLOCCULATING OR PRECIPITATING OF FOREIGN SUBSTANCES FROM A LIQUID

Foreign substances suspended in fine form in liquids are in particular affected by flocculating agents, which generally contain inorganic salts, and particularly $Al^{+++}$ sulfates or $Al^{+++}$ chlorides. The suspended foreign substances are thereby destabilized and form larger particles which can settle out of the liquid. At the same time dissolved foreign substances are also bound and precipitated. Flocculation and precipitation of foreign substances from liquids is of particular importance for the purification of industrial or municipal waste waters and they furthermore play an important role in the preparation of drinking water and the carrying out of chemical processes.

The fact that as part of the flocculation there is also a precipitation of dissolved substances is of importance, particularly for waste-water purification. Here there are primarily concerned dissolved phosphates which as non-degradable substances are increasingly present in the waste waters. For this reason in waste water purification plants there is frequently carried out, during the process or after it, a so-called "further" waste water purification in which the foreign substances contained in the waste water are flocculated or precipitated in addition to the customary mechanical and biological purification. For this purpose, the flocculating agents are so dosaged in accordance with a generally automatic switching program that in each case there is a constant molar ratio of metal cations to phosphorus. Such a switching program operates in a fixed daily tempo and in practice rarely comprises more than four different dosagings. Such a control is not able to follow in optimal manner the variations of the contamination of the waste water and therefore the variations in the concentration of the foreign substances present in the waste water. If a given concentration of phosphorus is not to be exceeded in the discharge from a clarification plant, this can be assured only by an over-dose of the flocculating agent which is adapted to the highest value of a concentration of foreign substances to be expected.

It is furthermore known from practice to check the flocculation or precipitation upon the purification of waste waters by measuring the phosphorus content. Such verifications can also be effected automatically, but they require a period of time of 10–15 minutes for each purifying cycle and the automatic control devices required are extremely expensive. Furthermore, there is an additional difficulty upon direct measurement in the discharge of a clarifying plant. A value which has been measured in the discharge of the clarification plant (for instance the phosphorus concentration) can namely not be used for the dosaging of the addition of flocculating agent in the feed since the nature of the waste water fed may have changed considerably during the time of stay of the waste water in the clarification plant (which is typically about 2 hours).

The above disadvantages are inherent in the known processes described above also in the field of the preparation of drinking water. As compared with the advantage that in general the concentration of foreign substances in the incoming pipe water changes more slowly in case of the preparation of drinking water than in the case of the purification of waste water, there is the disadvantage that the quality of the discharging drinking water must be controlled very accurately. In this connection, whether the quality of the discharging drinking water can be improved by a larger or smaller addition of flocculating agent is of particular interest. Here there is known a process of the type described (see the literature reference "gwf-Wasser/Abwasser", 117, (1976), page 109), in which the flocculating agent is added stepwise in different doses to partial quantities of the liquid to be treated. The partial quantities which have been treated in this manner are allowed to stand aside for a relatively long period of time, as a rule about 30 minutes, as a result of which the foreign substances are precipitated and settled out in accordance with the dose of flocculating agent. The supernatent liquid in the samples is drawn off and the flocculating effect obtained with the specific dose of flocculating agent is measured by a turbidity measurement. The addition of flocculating agent to the liquid to be treated is then effected in accordance with the optimal addition of flocculating agent which has been established in this manner. It is known from experience, namely, that minimum turbidity of the liquid assures both optimal removal of the suspended foreign substances from the raw water and a minimum residual concentration of organic substances and phosphates. If flocculating agent is added in an amount greater than the optimal quantity, the foreign substances remain in part colloidally dissolved since their charge is reversed by excess flocculating agent. An over-dosing of the flocculating agent therefore leads to increased turbidity of the supernatent liquid. This method, which is also known as the "Jar Test" is disadvantageous insofar as it gives rise to a considerable amount of work and is furthermore very time consuming since it is necessary in each case to wait for the settling of the individual samples. While it is known also to carry out the method automatically (see "Degremont Handbuch der Wasseraufbereitung"), considerable expense for apparatus is required for this purpose and furthermore in this case also each individual measurement still requires a comparatively long period of time.

The object of the invention is therefore to develop and improve the method of the aforementioned type in such a way that a rapid, reliable and trouble-free determination of the optimal addition of flocculating agent is made possible. From a purely physical standpoint that addition of flocculating agent with which the most extensive flocculation and precipitation can be obtained is optimal. In general, however, economic factors (time expended, plant capacity, cost of flocculating agent, etc.) must also be considered so that optimization must be defined specifically in each individual case. The object of the present invention is to make available in each case, under the requirements indicated, an unambiguous measurement value which can be taken as basis for the optimalizing of the addition of flocculating agent.

The method of the invention by which this object is achieved is characterized by the fact that the turbidity measurement is carried out while settling of the flocculated or precipitated foreign substances is prevented and that the addition of flocculating agent to the liquid to be treated is determined in accordance with an increase in turbidity which occurs in the partial quantity or quantities upon the addition of flocculating agent.

The invention proceeds from a precise observation of the typical settling curve, i.e. the variation with time of the change in turbidity upon the addition of the flocculating agent. It has been found here that upon the addition of the flocculating agent there is initially an increase in turbidity which remains constant if the settling of the flocculated or precipitated foreign substances is prevented, for instance by agitation. Only when settling is permitted—for instance by stopping the agitation—does the turbidity drop below the initial value. The increase in turbidity, which takes place within a short time (a few seconds) has been overlooked up to now since in the known method of operation the turbidity has been measured only after settling has taken place, i.e., only after a period of time of generally 30 minutes. Furthermore, the invention is based on the surprising discovery that there is a close correlation between the increase in turbidity which takes place rapidly and the optimum addition of flocculating agent, which heretofore could be determined only after complete settling. Furthermore, the increase in turbidity depends on the dose of flocculating agent. Turbidity and phosphorus content vary substantially parallel to each other and pass, in known manner, through a minimum which corresponds to the optimum addition of flocculating agent. The increase in turbidity, which in each case is measured shortly after the addition of the flocculating agent, depends on the addition of flocculating agent and is furthermore correlated with the optimal addition of flocculating agent which corresponds in each case to the liquid being treated. Thus there is an unambiguously evaluatable relationship between the specific addition of flocculating agent, the increase in turbidity observed upon same, and the optimal addition of flocculating agent which is to be determined.

Starting from this, the invention provides various advantageous embodiments of the method described.

In a first embodiment in which several partial quantities are treated in different doses with flocculating agent, the addition of the flocculating agent to the liquid to be treated is determined on basis of the dose of flocculating agent added to the partial quantity with which the increase in turbidity assumes a maximum value. This manner of operation is based on the fact that the increase in turbidity passes through a maximum as a function of the addition of flocculating agent and then decreases upon the addition of a larger quantity of flocculating agent. While the maximum is present with a higher dose than corresponds to the optimum addition of flocculating agent there is nevertheless a clear correlation. Good results are obtained when the addition of flocculating agent amounts to about 60% of the dose which corresponds to the maximum increase in turbidity. This manner of operation has the particular advantage that only the dose of flocculating agent need be determined precisely while the increase in turbidity can be measured in relative value by means of an uncalibrated measuring instrument. The measurement can also be effected continuously, the partial quantities of liquid flowing continuously one after the other for instance through a pipeline and being treated, during this, with doses of flocculating agent which increase stepwise or else continuously. It is self-evident that in this connection the time constant with which the increase in turbidity is established must be taken into consideration.

Another embodiment of the method in which also several individual quantities are treated with different doses of flocculating agent is characterized by the fact that a maximum value of the increase in turbidity is measured in the partial quantities which have been treated with different doses of flocculating agent and that the addition of flocculating agent to the liquid to be treated is determined on basis of the maximum value. In this case one proceeds from the basis that the absolute value of the maximum increase in turbidity is also correlated to the optimum addition of flocculating agent. In this case the maximum value is measured in absolute value by a calibrated measuring instrument, while a precise determination of the dose of flocculating agent is not necessary. The dose of flocculating agent can increase here in any desired manner; it need only exceed the dose corresponding to the maximum value of the increase in turbidity. This is particularly advantageous in case of continuous measurement in flowing partial quantities to which flocculating agent is continuously added.

In another embodiment in which, once again, several partial quantities are treated with different doses of a flocculating agent, the integral of the functional dependence of the increase in turbidity on the dose of flocculating agent to the partial quantities between the lower limit of zero and an upper limit which is smaller than or approximately equal to the dose of flocculating agent for maximum increase in turbidity is determined and the addition of flocculating agent to the liquid to be treated is determined in accordance with this integral. The upper limit up to which the integral is taken can, to be sure, in principle be any desired but the limitation indicated is advisable for rapidity and precision of the measurement.

The embodiments of the method of the invention which have been described above can be carried out in the manner that the partial quantities flow continuously one behind the other through a pipeline and are treated at this time with stepwise increased doses of flocculating agent.

The method of the invention also permits a manner of procedure in which only one partial quantity is treated with a predetermined dose of flocculating agent. In this case the addition of flocculating agent to the liquid to be treated is determined in accordance with the increase in turbidity which takes place in the partial quantity. This manner of operation is characterized by particular rapidity. The measurement value determined at the same time represents a difference quotient of the functional dependence of the increase in turbidity on the dose of flocculating agent which passes—upon a decrease in the dose of flocculating agent and corresponding sensitivity of measurement—into the differential quotient. Use is made in this connection of the fact that the initial rise in the increase in turbidity is also in a monotonic relationship to the optimum addition of flocculating agent. In this case also one can operate with a partial quantity flowing in a pipeline.

The methods described above are more or less steady-state methods. However, a non-steady-state method is also possible. For this a predetermined quantity of the flocculating agent is injected pulsewise into a partial quantity of the liquid flowing in a pipeline, a maximum value in time of the increase in turbidity is measured in the flowing partial quantity, and the addition of flocculating agent to the liquid to be treated is determined on basis of this maximum value. The other prerequisites being the same, a maximum differential quotient in time of the increase in turbidity can also be measured. In both cases, it must be seen to it that the addition of flocculating agent to the flowing partial quantity is effected in an exactly reproducible manner.

Optimal accuracy can be obtained if the different manners of operation are suitably combined by the use of statistical methods. One very simple and inexpensive procedure is to determine the addition of flocculating agent to the liquid to be treated in accordance with the, possibly weighted, arithmetic mean of several or all of the measurement values controlling, in accordance with the procedures described above, for the determination of the addition of flocculating agent to the liquid to be treated. Methods of so-called evaluation statistics or decision statistics can also be used.

Particular accuracy is finally obtained by the use of multiple linear regressions, whereby it is possible in optimal manner to take into consideration the fact that the methods described depend to a certain extent on the nature of the specific liquid to be treated. For this purpose the present invention provides that the addition of flocculating agent to the liquid to be treated is to be determined in accordance with a linear regression from several or all of the measurement values controlling in accordance with the methods described above for the determination of the addition of flocculating agent to the liquid to be treated, the regression coefficient being determined by statistical evaluation of an ensemble of sample measurements. In particular there can also be taken into consideration in addition as regression variable easily measurable parameters such as, for instance, the pH, the conductivity, and/or the temperature of the liquid to be treated. In each case, the linear regression is represented fundamentally by the expression $$a_1 x_1 + a_2 x_2 + \ldots ,$$

in which $a_1, a_2, \ldots$ represent the regression coefficients and $x_1, x_2, \ldots$ represent the controlling measurement values obtained by the different methods of operation. Different measurement sensitivities and/or dependencies on the nature of the liquid to be treated can be taken into consideration by applying different weights to the controlling measurement values. The regression analysis can be readily carried out with an ordinary process computer.

The embodiments of the method of the invention which have been described make it readily possibly by simple experiment, to determine the optimum addition of flocculating agent, with due consideration of the economic factors present in ease case. If one operates with discrete doses of flocculating agent, intermediate values can, of course, be determined by simple interpolation or by extrapolation by the least-squares method.

As is known, the effectiveness of ordinary flocculants depends on the pH of the liquid to be treated. By the method of the invention the optimal addition of flocculating agent is determined with due consideration of the pH. This means that a larger addition of flocculating agent may under certain circumstances be established than would be necessary with the most favorable pH. It is therefore advisable to measure and possibly adjust the pH.

The advantages obtained from a process standpoint by the invention reside in particular in the fact that the possibility is created of effecting a rapid, reliable, trouble-free determination of the optimal addition of flocculating agent at low expense. These advantages can be obtained with practically all technical processes in which flocculation or precipitation is effected, for instance for the purification of waste water, the preparation of drinking water and also the carrying out of chemical production processes.

The operations described can be carried out substantially in the form that the increase in turbidity is measured on discrete partial quantities, in each case under steady-state conditions. A particularly advantageous apparatus for the carrying out of the processes of the invention has a treatment vessel for the adding of flocculating agent to the liquid to be treated, as well as a measuring device connected thereto which comprises a measuring instrument with inlet and outlet for partial quantities of the liquid, means for the dosaged addition of flocculating agent, and a photometer probe, and it is characterized by the fact that the measurement vessel consists of a mixing path in the form of a pipeline and a measurement trough which is arranged behind the mixing paths as seen in the direction of flow and on which the photometer probe is arranged, that the means for the dosaged addition of flocculating agent is arranged in the form of an adjustable dosaging pump in front of the mixing path as seen in the direction of flow, and that the addition of flocculating agent to the liquid to be treated is taken into consideration by a control device connected to the dosaging pump and the photometer probe, and that furthermore the addition of the flocculating agent is controlled in accordance with a quantity signal which represents the quantity of liquid to be treated. This apparatus in accordance with the invention permits of continuous automatic control of the flocculating or precipitating of foreign substances from the liquid to be treated.

The invention will be explained in further detail below with reference to the drawing in which.

Figure 1:
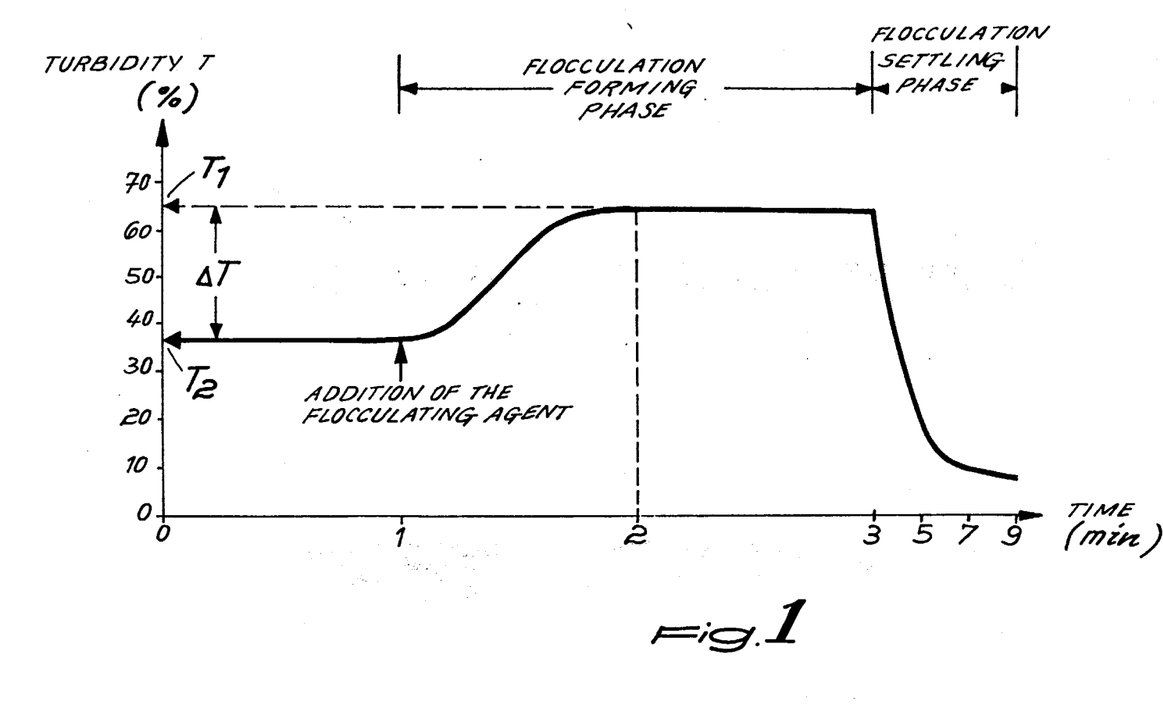
FIG. 1 is a typical settling curve, shown diagrammatically.
Figure 2:
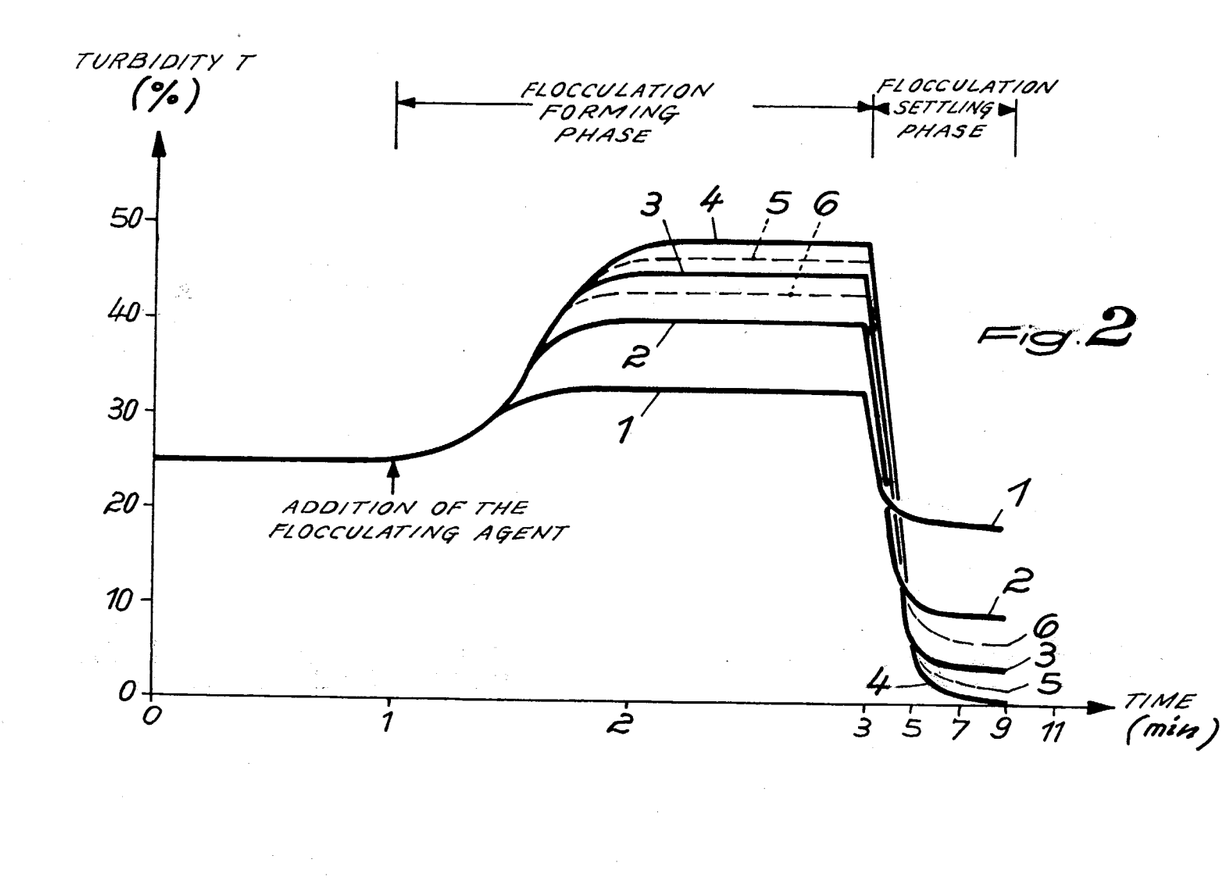
FIG. 2 is the curve of FIG. 1, with linearly increasing addition of flocculating agent.
Figure 3:
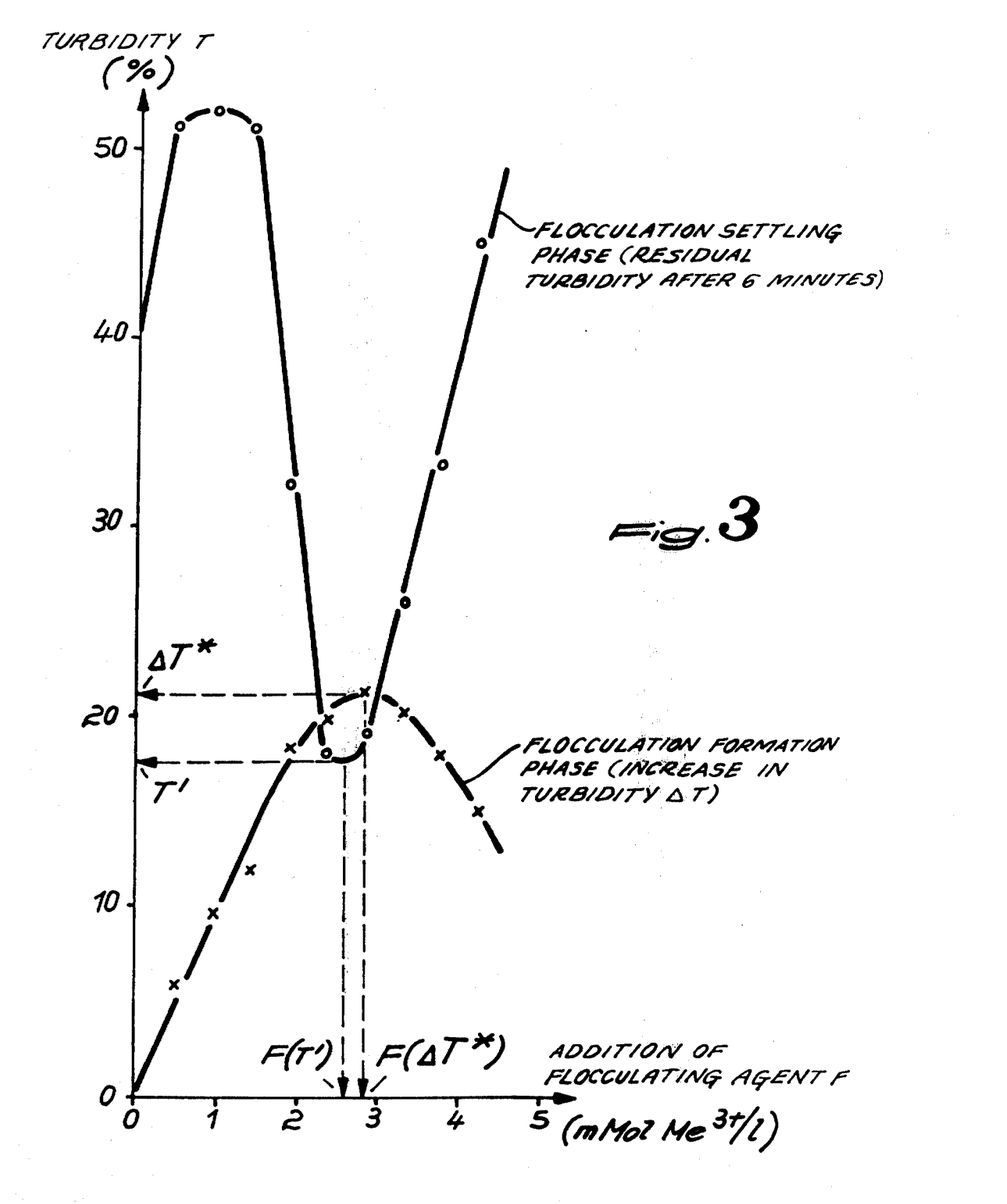
FIG. 3 shows the dependence of the increase $\Delta T$ in turbidity (and of the turbidity T) on the addition of flocculating agent.

In FIGS. 1 to 3 two phases of the flocculating process can be noted, on the one hand the flocculation-forming phase after the addition of the flocculating agent (with agitation) and on the other hand, the flocculation settling phase (without agitation).

FIG. 1 shows the typical course of the turbidity as a function of the time in the case of an ordinary waste water, with the use of aluminum chloride (technical waste product consisting predominantly of aluminum chloride and containing ferric chloride as byproduct) as flocculating agent (in the following these two cations are designated by the common symbol $Me^{+++}$). During the first minute, the turbidity $T_2$ of the raw waste water without addition of flocculating agent with agitation is recorded. Due to the influence of the turbulence in the vessel the turbidity is slightly higher than the value without agitation. After the addition of flocculating agent the turbidity increases and reaches a plateau value $T_1$. This plateau is reached in general within 30 seconds in the case of smaller additions of flocculating agent. With larger quantities and with overdosing the establishing of the plateau value takes about 60 seconds. Longer periods of time are only rarely observed. In order to determine the increase in turbidity $\Delta T$ during the flocculation forming phase the difference between the turbidity measured one minute after addition of the flocculating agent and the turbidity without additional flocculating agent has been used in all cases for all samples examined. During the flocculation settling phase, the clarification or decrease in turbidity of the first liquid zone with the agitator shut-off is observed. A settling time of 6 minutes has proven entirely sufficient for estimating the settlability of the flocculating; if the period of time until the measurement of the residual turbulence for a given raw water is extended for all additions of flocculating agent used up to, for instance, 30 minutes, the value for the slightest residual turbulence in the supernatant liquid is obtained for the same addition of flocculating agent.

Results in the case of raw water

FIG. 2 shows diagrammatically the flocculation forming and flocculation settling phases for a given raw waste water with linear increase in the addition of flocculating agent. The same flocculating agent is used as in FIG. 1. The additions of the amounts of 1 to 4 of flocculating agent effect an increasing increment in turbidity $\Delta T$ in the flocculation forming phase and an increasing reduction of the residual turbidity in the supernatant as compared with the zero test without flocculating agent in flocculation settling phase. If the addition of the flocculating agent is increased further (dosage quantities 5 and 6 in FIG. 2), the increase $\Delta T$ in turbidity on the one hand decreases and the residual turbidity, on the other hand, increases again.

If the increase in turbidity $\Delta T$ and the residual turbidity are plotted in each case as a function of the addition of flocculating agent, FIG. 3 is obtained in the case of a sample of raw waste water. In FIG. 3, the minimum T of the residual turbidity is very sharply pronounced and is present for a dosaged quantity of $F=2.6$ mmol $Me^{+++}/L$. The increase in turbidity $\Delta T$ in the flocculation forming phase increases initially linearly with an increase in the addition of flocculating agent and reaches its maximum value $\Delta T^*$ upon a (in this case somewhat larger) addition of flocculating agent of $F=2.8$ mmol $Me^{+++}/L$.

Figure 4:
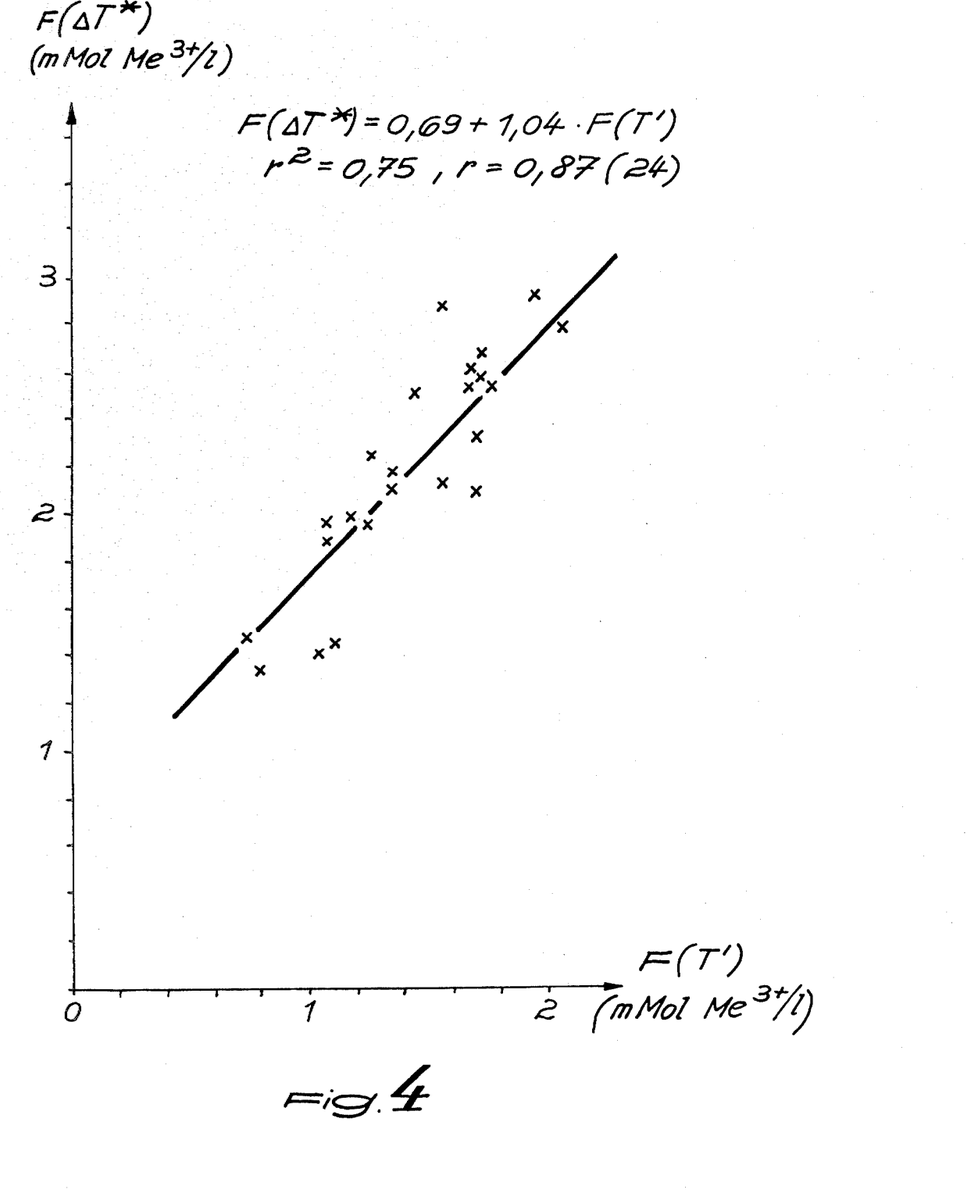
FIG. 4 shows the relationship between the addition of flocculating agent $F(\Delta T^*)$ which leads to the maximum increase in turbidity $T^*$ and the addition of flocculating agent $F(T')$ leading to the minimum turbidity $T'$, in the case of an ordinary waste water.
Figure 5:
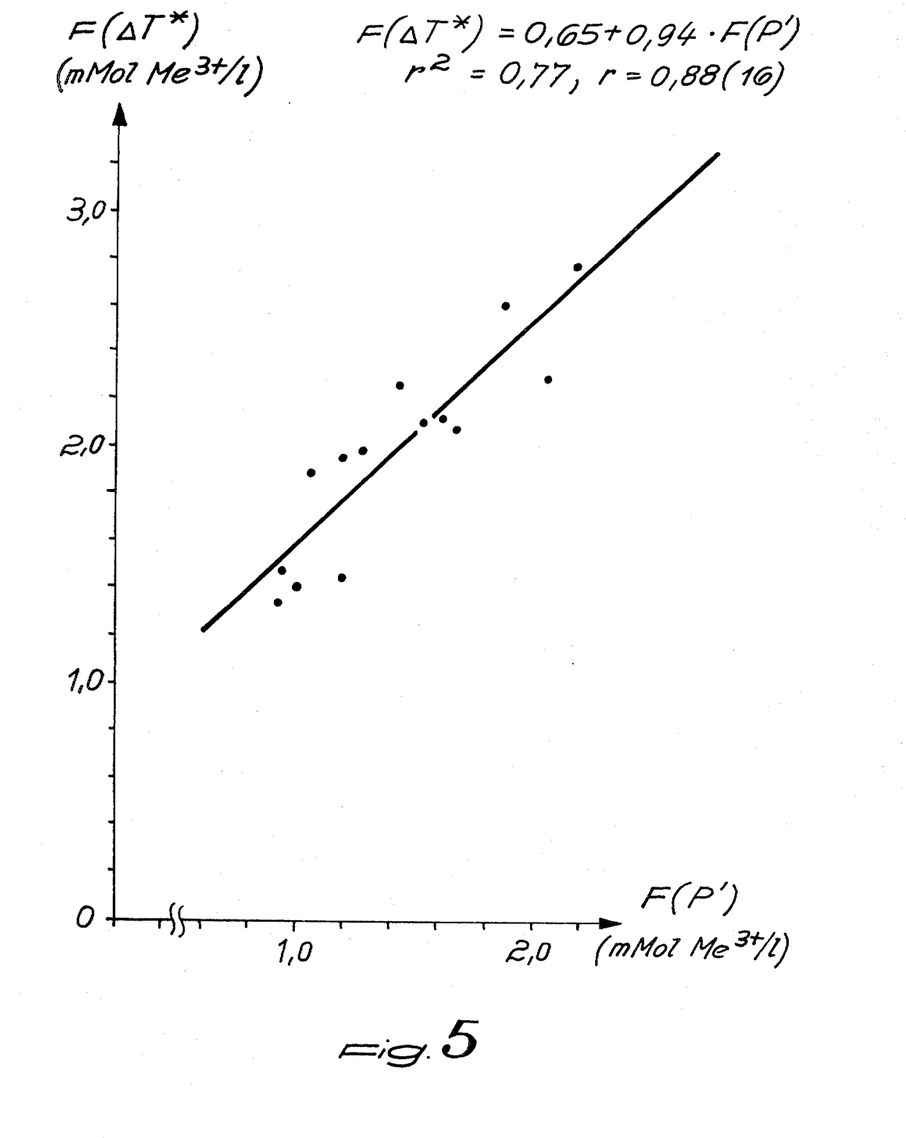
FIG. 5 shows the relationship between the addition of flocculating agent $F(\Delta T^*)$ leading to the maximum increase in turbidity $\Delta T^*$ and the addition of flocculating agent $F(P')$ leading to the minimum residual phosphorus concentration $P'$, with ordinary waste water.

FIGS. 4 and 5 show the relationship for the samples of raw waste water treated between the quantity dosed $F(\Delta T^*)$ which leads to the maximum difference in turbidity $\Delta T^*$ and those additions of flocculating agent which, in the flocculation-settling phase lead to the minimum residual turbidity $T'$ (FIG. 4) and residual phosphorus concentration $P'$ (FIG. 5) respectively. The corresponding correlation coefficients of $r=0.87$ (24) and $r=0.88$ (16), show, in the same way as the coefficient of determination $r^2$ (0.75 and 0.77 respectively), a significant relationship between the flocculation forming phase and the flocculation settling phase. (The numbers within parentheses behind the correlation coefficient refer to the number of raw waste waters examined, they consisting of waste water of very different degrees of contamination). The optimum addition of flocculating agent $F(T')$ or $F(P')$ is unequivocally determined by $F(\Delta T^*)$.

The equations determined from FIGS. 4 and 5 for $F(\Delta T^*)=f(F(T'))$ and $F(\Delta T^*)=f(F(P'))$ respectively furthermore show that, in general, the optimal addition of flocculating agent $F(T')$ or $F(P')$ (which leads to the minimum residual turbidity $T'$ and to the minimum residual phosphorus concentration $P'$ respectively) is less than $F(\Delta T^*)$ (the addition of flocculating agent which leads to the maximum increase in turbidity $\Delta T^*$ during the flocculation forming phase).

Here and in the following the optimal addition of flocculating agent to waste waters is defined both as $F(T')$ and as $F(P')$ for the reason that in the case of waste water, after the separation of the flocculation both the minimum residual phosphorus concentration and the minimum residual turbidity are associated practically with the same addition of flocculating agent.

Results in mechanically and biologically purified waste water (discharge of secondary sedimentation tank)

Figure 6A:
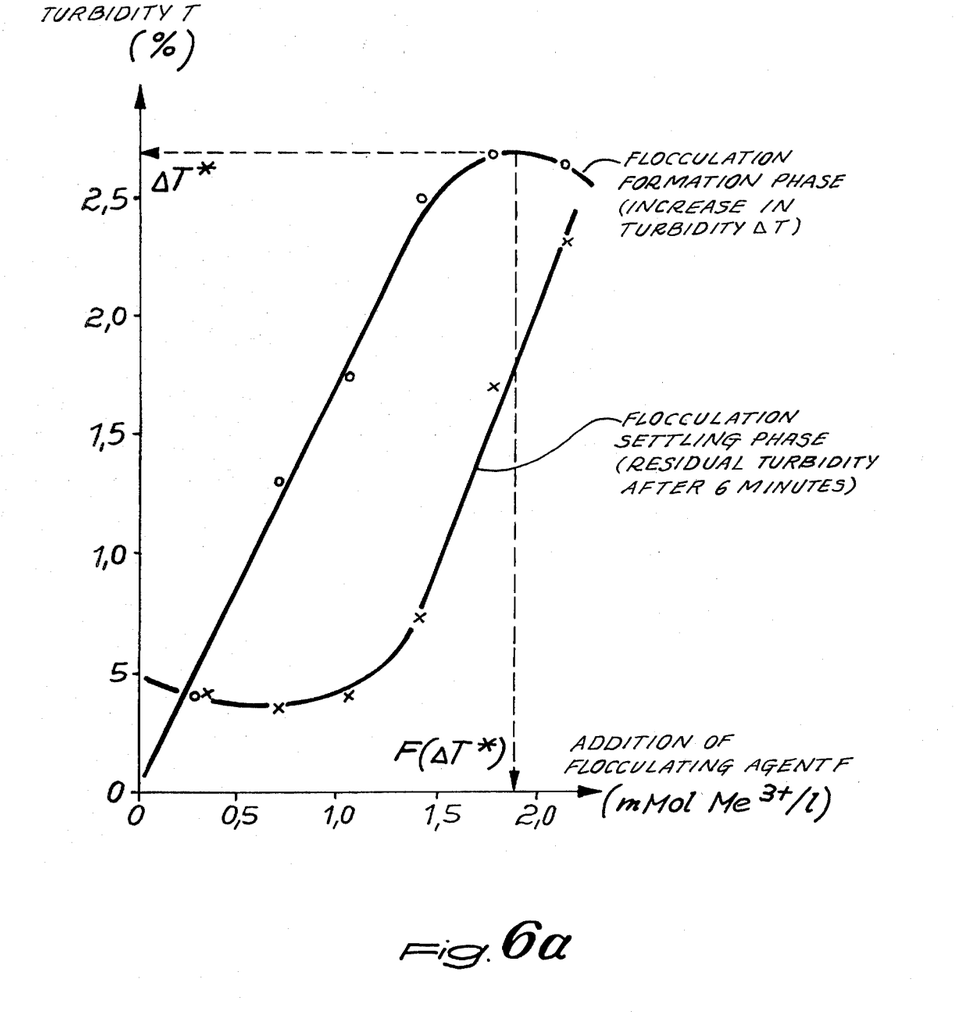
FIG. 6a shows the dependence of the increase $\Delta T$ in turbidity and of the turbidity T on the addition of flocculating agent in the case of a biologically purified waste water.

Mechanically and biologically purified waste water has a rather low initial turbidity (FIG. 6a) as compared with raw waste water (cf. FIG. 3) so that no significant reduction in the residual turbidity can be obtained during the flocculation settling phase by an increase in the addition of flocculating agent. However, if too much flocculating agent is added, the residual turbidity increases rapidly to above the initial value (FIG. 6a). On the other hand, the change in the residual phosphorus concentration (FIG. 6b) does not differ from the experiments with raw waste water. The parabolic curve passes clearly through a minimum. The flocculation forming phase (FIG. 6a) is also completely comparable to the experimental results obtained for raw waste water (see FIG. 3). The increase in turbidity $\Delta T$ initially rises linearly with the increase in the addition of the flocculating agent and then reaches a maximum $\Delta T^*$ (FIG. 6a).

Figure 7:
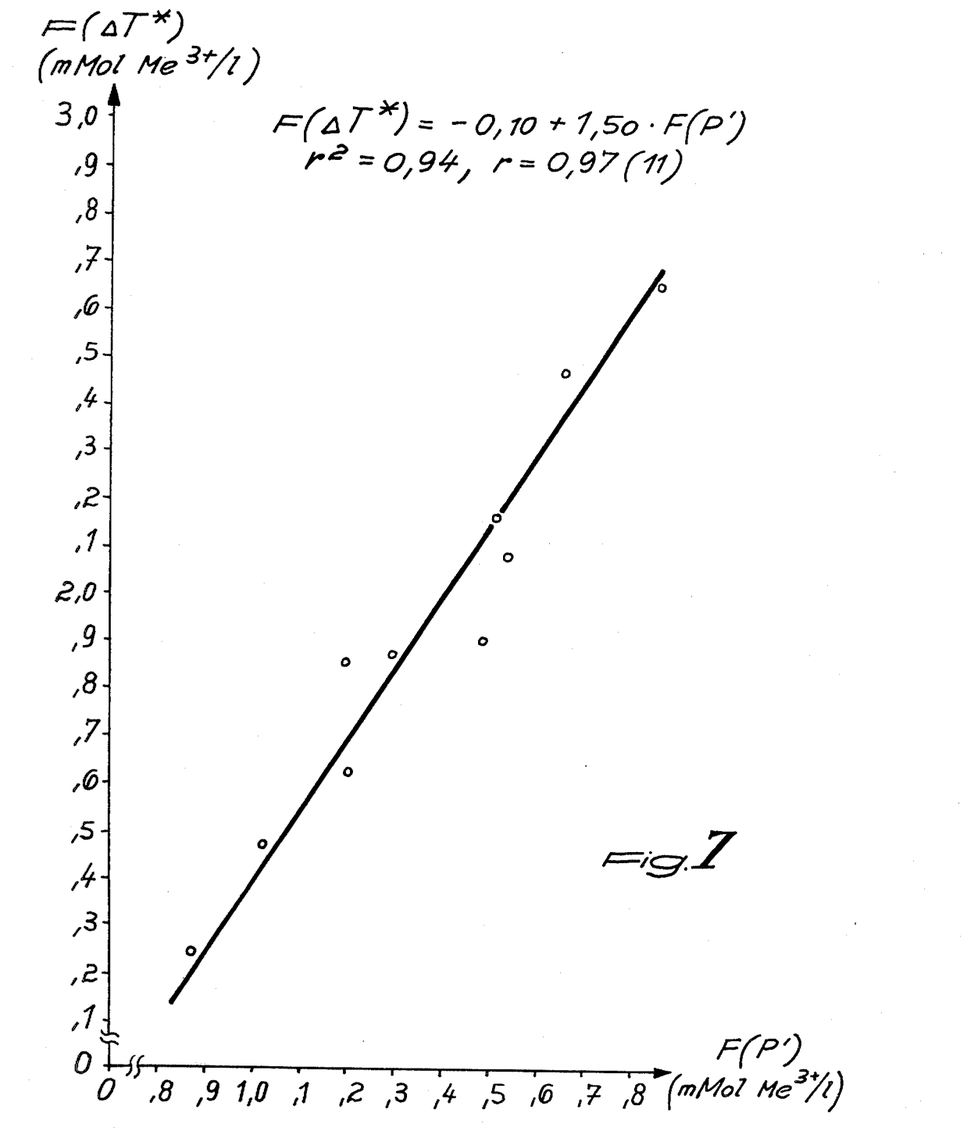

FIG. 7 shows the relationship between the additions of flocculation agent $F(\Delta T^*)$ and $F(P')$ corresponding to the maximum increase in turbidity $\Delta T^*$ and the minimum residual phosphorus concentration $P'$ respectively. The determination coefficient of the lines is $r^2=0.94$ and the correlation coefficient $r=0.97$ (in 11 tests). (The relationship to the minimum residual turbidity $T'$ is not shown here since the precise minimum turbidity could be determined only difficultly for the corresponding curves in samples of the discharge of secondary sedimentation tanks.) The determination of the addition of flocculating agent $F(\Delta T^*)$ corresponding to the maximum difference in turbidity $\Delta T^*$ in this case makes it possible to control the dosaged quantity in the secondary precipitation method for optimal removal of phosphorus with even a smaller range of dispersion than in the case of raw waste water (cf. FIG. 5).

Results with surface water

With surface water also, the turbidity in the flocculation forming phase and the residual turbidity in the supernatent liquid after the settling process show fundamentally the same course as in the case of the samples of discharge from the secondary sedimentation tanks (see FIG. 6a). Only the dispersions in the residual-turbidity values are in general larger in the case of surface water. The maximum difference in turbidity $\Delta T^*$ of the flocculation forming phase, on the other hand, is frequently even sharper than upon the flocculating of samples of waste water.

Figure 6B:
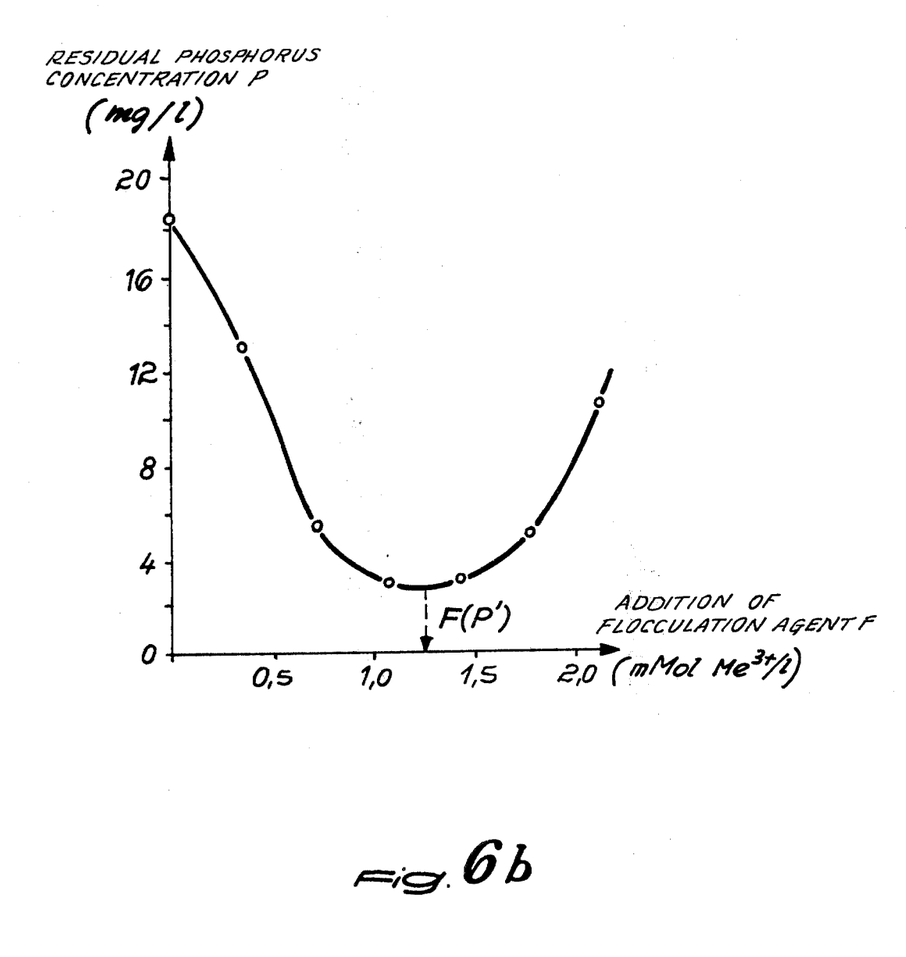
FIG. 6b shows the dependence of the phosphorus residual concentration P on the addition of flocculating agent F for the same case as in FIG. 6a, FIG. 7 shows the relationship between the addition of flocculant $F(\Delta T^*)$ leading to the maximum increase in turbidity $\Delta T^*$ on the addition of flocculating agent $F(P')$ leading to the minimum concentration of phosphorus $P'$.

Residual phosphorus concentration behaves similarly to the experiments with samples of waste water (cf. FIG. 6b). For the preparation of drinking water, to be sure, the removal of colloidally and molecularly dispersely distributed inorganic and organic substances is more important. However, in this case also there is a clear relationship between $F(\Delta T^*)$ and the minimum residual content of organic substances after the separation of the flocculation.

Figure 8:
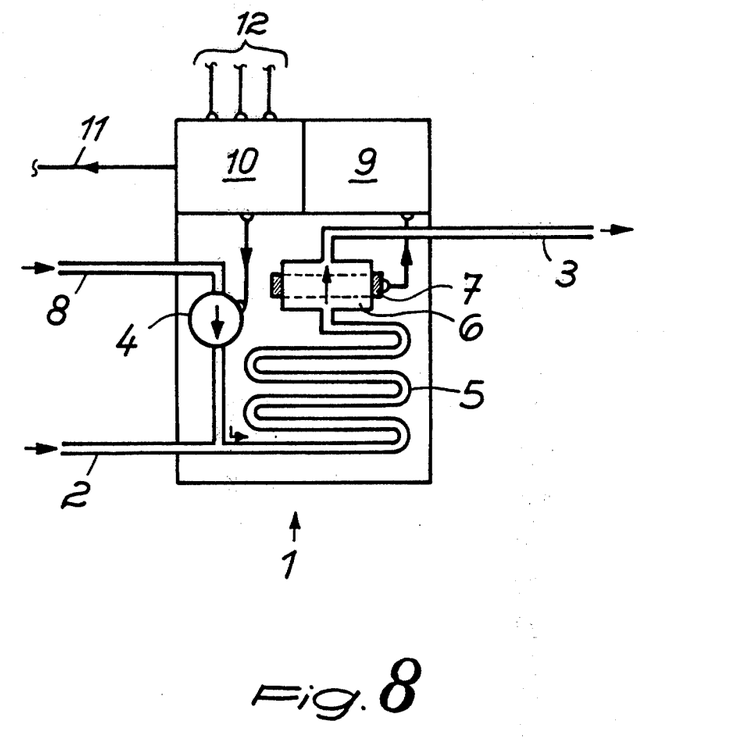
FIG. 8 shows a measuring device for determining the optimal addition of flocculating agent.

FIG. 8 shows a measuring device 1 intended as part of an apparatus for controlled flocculation or precipitation, which apparatus, for the branching off of partial quantities of the liquid to be treated, may have its inlet 2 connected, for instance, to the inlet of a treatment vessel, not shown in FIG. 8. The partial quantities of the liquid are fed to the measuring instrument, which consists of a mixing path 5, having the shape of a pipe coil in the embodiment shown, and a measurement trough 6 arranged behind same as seen in the direction of flow. A photometer probe 7 is arranged on the measurement trough 6. The photometer probe 7 can be developed either as extinction photometer or as dispersion photometer. In either case, the turbidity of the liquid contained in the measurement trough is measured. After the measurement, the liquid is removed from the measurement device 1 via the outlet 3. There is also provided an electrically controlled dosaging pump 4 which is connected to a flocculating-agent feed 8 and discharges into the measurement vessel in front of the measurement path 5 as seen in the direction of flow. The partial quantities which are branched off from the liquid to be treated are accordingly, while they continuously flow through the measuring device 1, treated in dosed amount with the flocculating agent, mixed in the mixing path 5, examined for resultant turbidity in the measurement trough 6 and finally removed through the outlet 3. The length of the mixing path 5 is so determined that for a given velocity of flow of the partial quantities the time of flow is at least as long as the time necessary for the formation of the increases in turbidity to be measured.

The course of the measurement is controlled by a control apparatus 10, which is connected with the controllable dosaging pump 4 and—via a photometer electronics unit 9—with the photometer probe 7. The control apparatus 10 gives off a control signal 11 in accordance with the measured and possibly suitably converted values of the increase in turbidity, by which signal the addition of flocculating agent to the liquid to be treated is brought to the optimum value in the treatment vessel (not shown). Furthermore, the control apparatus 10 may have additional external inputs 12 via which additional measurement values are fed and can be taken into account in the determination of the optimal addition of flocculating agent. Such measured values consist, first of all, of a signal for the quantity of the liquid to be treated, and furthermore measured values for the pH, the alkalinity, the conductivity, the temperature, etc., of the liquid to be treated.

The course of the measurement is as follows:

While partial quantities branched off from the liquid to be treated flow through the measurement device 1, the photometer value of the liquid, for instance a waste water to be purified, is first of all determined without the addition of flocculating agent. Then flocculating agent is added in a given dose for a short time. It mixes in the mixing path 5 with the waste water and leads to the formation of flocculation which is determined by the photometer probe 7 on basis of the increase in turbidity. This value drops after passage through the flocculation zone. This can be repeated in succession with different doses of flocculating agent. However, it is also possible to operate in the above-described manner with only one dose of flocculating agent. The control apparatus 10 in such case controls the activity of the controllable dosaging pump 4, stores and compares the measurement values given off by the photometer probe 7 via the photometer electronic system 9 and determines, possibly with due consideration of the additional measurement values fed via the external inputs 12, a control signal 11 on basis of which the optimal addition of flocculating agent to the liquid to be treated is adjusted.

Figure 9:
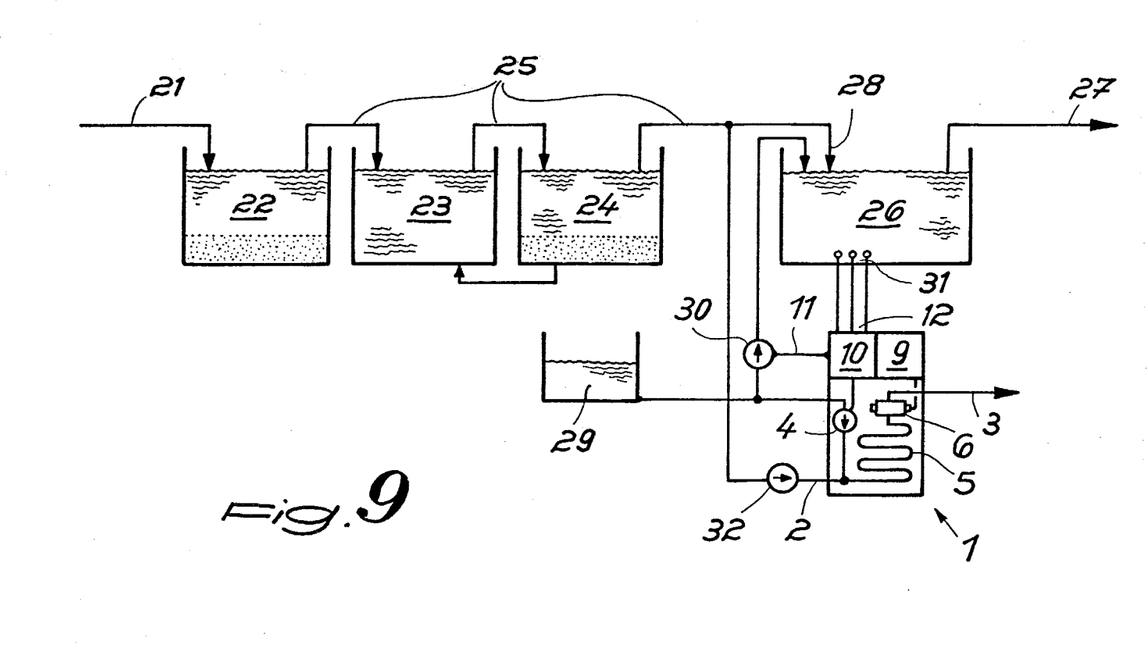
FIG. 9 shows an apparatus for the controlled flocculation within a waste-water purification plant.

FIG. 9 shows an apparatus for the controlled flocculation or precipitation of foreign substances from a liquid within a waste-water clarification plant in which a substantial purification of the waste water is provided for the removal of suspended solids and phosphates. There can be noted a raw water inlet 21 and then adjoining same in succession as seen in the direction of flow, a settling tank 22 for the mechanical purification, an activated-sludge tank 23 for the biological purification, and another settling tank 24 for the secondary purification. The settling tank 22, the activated-sludge tank 23, and the settling tank 24 are connected with each other by transfer conduits 25 and furthermore the activated sludge which has settled out in the settling tank 24 can be returned in customary manner to the activated-sludge tank 23. After this purification which is effected up to now in customary manner there follows a further waste-water purification which, in the embodiment shown, takes place in a special subsequent treatment container 26. This further waste-water purification can also take place, however, within one of the preceding purification stages. The purified water is discharged through a clarified water outlet 27.

The measurement device 1 whose inlet 2 is connected to a treatment container inlet 28 via a partial-quantity delivery pump 32 is associated with the treatment container 26. In this way partial quantities of the waste water to be treated can be branched off, conducted through the measuring device 1, and removed through an outlet 3, for instance discharged into the treatment container 26. A flocculating agent storage container 29 is connected directly to the flocculating agent feed 8 of the measuring device 1 and, via a controllable delivery pump 30, to the treatment container 26. The addition of flocculating agent in the treatment container 26 is adjusted by the controllable feed pump 30 in accordance with the control signal 11 which is given off by the control apparatus 10 corresponding to the measurement and evaluation of the increase in turbidity in the partial quantities of the liquid flowing through the measuring device 1. Additional measured values, for instance for pH, alkalinity, conductivity, or temperature of the waste water to be treated, can be determined by measurement probes 31 provided in the treatment container 26 and fed to the outer inputs 12 of the control device.

Figure 10:
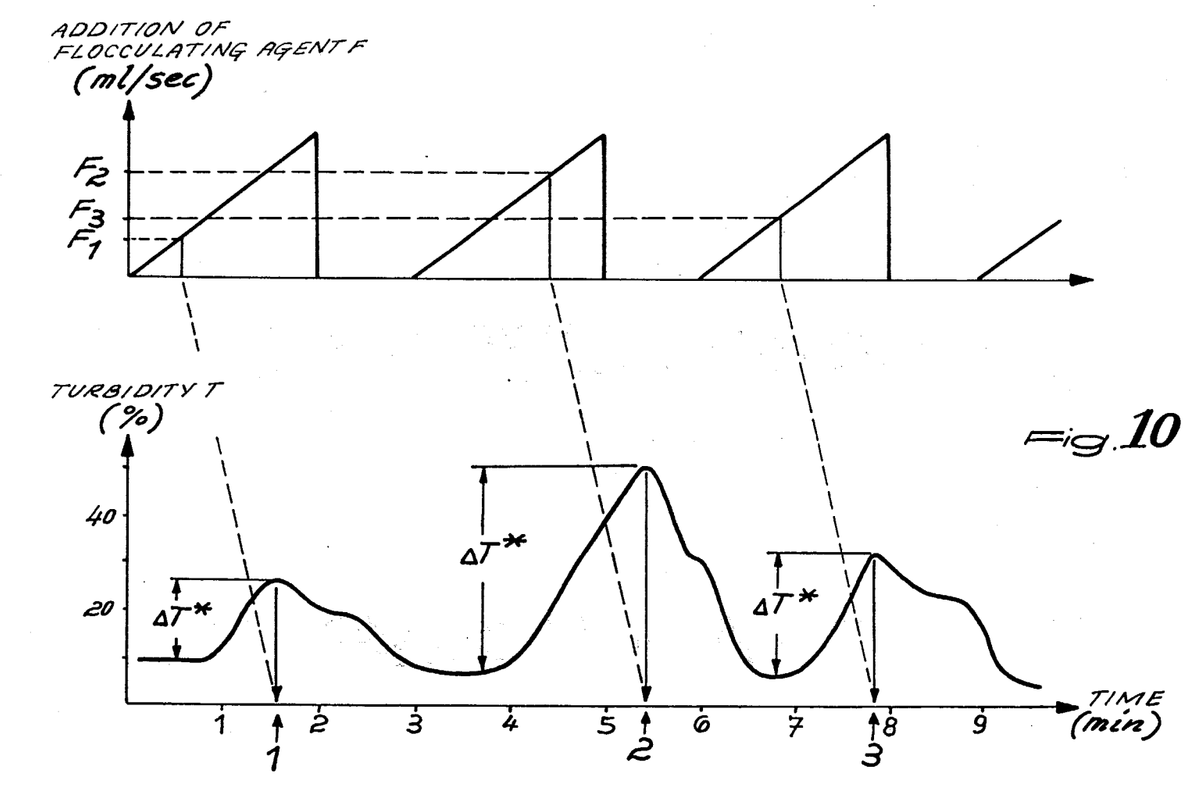
FIG. 10 is a graphical experimental record which covers the use of the apparatus shown in FIG. 9.

FIG. 10 shows a test record for the use of the apparatus shown in FIG. 9. The controllable dosaging pump 4 dosages the flocculating agent in the manner described. The increase in turbidity commences with the corresponding delay and reaches a maximum value. The subsequent drop in the turbidity curve is a result of over-dosaging. For example, by means of a microprocessor the maximum increase in turbidity $\Delta T^*$ is determined from the maximum of the turbidity curve and the initial turbidity of the raw water and the corresponding addition of flocculating agent $F(\Delta T^*)$ associated. This value serves as input signal for the controlling of the dosaged quantity in the industrial plant.

In the method of the invention, the addition of flocculating agent $F(\Delta T^*)$ which is determined via the increase in turbidity in the flocculation forming phase correlates linearly with high coefficient and correspondingly low range of dispersion, with the addition of flocculating agent $F(T')$ which is optimal for the settling process. The optimal addition of flocculating agent can therefore be predicted in advance with a high degree of accuracy and to this extent guarantees an optimum course of the process at minimum expense. The results obtained from the combersome "Jar Test" are available faster and more simply than in the latter. As compared with the control of the flocculation via the turbidity or oxidizability of the water in the outlet of the sedimentation tank there is furthermore the great advantage that there is no danger of over-dosaging.

The method of the invention permits optimal elimination not only of colloids and suspended matter but also of phosphorus, which is of particular importance from the standpoint of making surface and ground water eutrophic.

The apparatus of the invention supplies the optimal addition of flocculating agent within only 3 minutes. It is to be expected that with further optimalization of the process and apparatus the value will be available even more rapidly. As a consequence there is a high degree of adaptability to the nature of the specific raw water, which is of the greatest interest in particular in the field of industrial and municipal waste-water treatment.

The apparatus itself consists of extremely simple building blocks which have proved their suitability for a long time in the chemical industry and in the treatment of water. This results in a simple manner of operation, which is of considerable importance in view of the state of education of the personnel normally available today in clarification plants. The amount of daily maintenance is also very low.

The method of the invention is not limited to plants operating in accordance with the sedimentation principle for the separation of the flocculation. It can be applied in similar manner also to those plants in which the separation of the flocculation is effected by flotation or filtration. It must be borne in mind in this connection that the maximum value of $F(\Delta T)$ may vary depending on the method of separation and the nature of the flocculating agent. However, in all cases there is a clear relationship between $F(\Delta T^*)$ and the minimum contamination after the separation of the flocculation. In this way, the linear relationship between $F(\Delta T^*)$ and the optimal addition of flocculating agent which is found in the flocculation-formation phase of flocculating agent can be applied, by means of a conversion factor which can be determined by a few preliminary tests with respect to flotation or filtration separation, also to the last-mentioned methods.

We claim:

1. Process for the controlled flocculation or precipitation of foreign substances from a liquid to be treated by addition of a flocculating agent comprising the steps of: adding the flocculating agent in dosaged amount to at least a portion of the liquid to be treated, measuring the turbidity of the flocculation or precipitation caused thereby in the portion and preventing the settling of the flocculated or precipitated foreign substance while the turbidity measurement is being effected, determining from the measurements of turbidity the quantity of flocculating agent which produces the maximum amount of turbidity where the settling is prevented, computing an optimum amount of flocculating agent as a function of the quantity of flocculating agent which produces said maximum value, and adding the optimum amount of flocculating agent to the liquid to be treated.

2. Process according to claim 1 in which several portions of liquid to be treated are each treated with different doses of flocculating agent according to the process of claim 1, wherein the addition of flocculating agent to the liquid to be treated is determined in accordance with the dose of flocculating agent to that portion in which the increase in turbidity assumes a maximum value.

3. Process according to any of claims 1, 2, 5, or 6, characterized by the fact that the portions flow continuously one after the other through a pipeline and are treated therein with flocculating agent in stepwise increased doses.

4. Process according to any of claims 2, 5, 6, 7 or 8, wherein the addition of flocculating agent to the liquid to be treated is determined in accordance with a linear regression of the measured value for the determination of the addition of flocculating agent to the liquid to be treated, the regression coefficients being determined by statistical evaluation of an ensemble of test measurements.

5. Process according to claim 1 in which several portions of liquid to be treated are each treated with different doses of flocculating agent according to the process of claim 1, wherein a maximum value of the increase in turbidity is measured in the portions treated with different doses of flocculating agent and the addition of flocculating agent to the liquid to be treated is determined in accordance with said maximum value.

6. Process according to claim 1, in which several portions of liquid to be treated are treated with different doses of flocculating agent according to the process of claim 1, wherein the integral of the functional dependence of the increase in turbidity on the doses of flocculating agent to the portions is determined between the lower limit of zero and an upper limit which is smaller than or approximately equal to the dose of flocculating agent for maximum increase in turbidity, and the addition of flocculating agent to the liquid to be treated is determined in accordance with said integral.

7. Process according to claim 1, characterized by the fact that only one portion is treated with a predetermined dose of flocculating agent and that the addition of flocculating agent to each liquid to be treated is determined in accordance with the increase in turbidity occurring in said portion thereof.

8. Process according to claim 1, wherein a predetermined quantity of the flocculating agent is injected in pulse-like manner into a portion of the liquid to be treated flowing in a pipeline and that a maximum value in time of the increase in turbidity is measured in said flowing portion and the addition of flocculating agent to the liquid to be treated is determined in accordance with said maximum value.

9. Process according to claim 1, wherein a predetermined quantity of the flocculating agent is injected in pulse-like manner into a portion of the liquid to be treated flowing in a pipeline, that a maximum differential quotient in time of the increase in turbidity is measured in said flowing portion, and that the addition of flocculating agent to the liquid to be treated is determined in accordance with said maximum value.

10. Apparatus for the controlled flocculation or precipitation of foreign substances from a liquid by addition of a flocculating agent, comprising a treatment vessel for the addition of flocculating agent to the liquid to be treated, a measuring device connected with the treatment vessel and including a measuring vessel with an inlet and an outlet for portions of the liquid, said inlet of said measuring vessel being connected to the liquid to be treated, the measuring vessel comprising a mixing path in the form of a pipeline and a measurement trough arranged behind the mixing path, as seen in the direction of flow, a photometer probe arranged on the measurement trough, means for providing dosaged addition of flocculating agent comprising a controllable dosaging pump arranged in front of the mixing path as seen in the direction of flow, and control apparatus for controlling the addition of flocculating agent to the liquid to be treated in said treatment vessel based upon data from the dosaging pump and the photometer probe.

* * * * *